(12) United States Patent
Kovachka-Dimitrova et al.

(10) Patent No.: US 7,721,283 B2
(45) Date of Patent: May 18, 2010

(54) DEPLOYING A VARIETY OF CONTAINERS IN A JAVA 2 ENTERPRISE EDITION-BASED ARCHITECTURE

(75) Inventors: Monika M. Kovachka-Dimitrova, Sofia (BG); Rumiana G. Angelova, Dimitrovgrad (BG)

(73) Assignee: SAP AG, Walldorf (DE)

( * ) Notice: Subject to any disclaimer, the term of this patent is extended or adjusted under 35 U.S.C. 154(b) by 1092 days.

(21) Appl. No.: 10/852,893

(22) Filed: May 24, 2004

(65) Prior Publication Data

US 2005/0262477 A1 Nov. 24, 2005

(51) Int. Cl.
G06F 9/445 (2006.01)
G06F 9/44 (2006.01)

(52) U.S. Cl. .............. 717/177; 717/102; 717/116; 717/121

(58) Field of Classification Search ........... 717/118, 717/148, 107, 120; 709/203
See application file for complete search history.

(56) References Cited

U.S. PATENT DOCUMENTS

| | | | |
|---|---|---|---|
| 5,999,972 A | 12/1999 | Gish | |
| 6,253,282 B1 | 6/2001 | Gish | |
| 6,266,709 B1 | 7/2001 | Gish | |
| 6,272,555 B1 | 8/2001 | Gish | |
| 6,272,556 B1 | 8/2001 | Gish | |
| 6,304,893 B1 | 10/2001 | Gish | |
| 6,424,991 B1 | 7/2002 | Gish | |
| 6,434,598 B1 | 8/2002 | Gish | |
| 6,604,209 B1 * | 8/2003 | Grucci et al. | 714/38 |
| 6,643,650 B1 | 11/2003 | Slaughter et al. | |
| 6,725,453 B1 | 4/2004 | Lucas et al. | |
| 6,745,387 B1 | 6/2004 | Ng et al. | |
| 6,766,477 B2 | 7/2004 | Grucci et al. | |
| 6,801,940 B1 | 10/2004 | Moran et al. | |
| 6,832,238 B1 | 12/2004 | Sharma et al. | |
| 6,996,588 B2 | 2/2006 | Azagury et al. | |
| 7,076,798 B2 * | 7/2006 | Chang et al. | 726/4 |
| 7,080,092 B2 | 7/2006 | Upton | |
| 7,089,584 B1 * | 8/2006 | Sharma | 726/4 |
| 7,150,015 B2 | 12/2006 | Pace et al. | |
| 7,159,224 B2 * | 1/2007 | Sharma et al. | 719/310 |
| 7,167,914 B2 | 1/2007 | Cohen et al. | |
| 7,246,358 B2 | 7/2007 | Chinnici et al. | |
| 2001/0011265 A1 | 8/2001 | Cuan et al. | |
| 2002/0178254 A1 | 11/2002 | Brittenham et al. | |
| 2002/0188538 A1 | 12/2002 | Robertson et al. | |
| 2002/0188869 A1 | 12/2002 | Patrick | |

(Continued)

OTHER PUBLICATIONS

IBM Corporation: International Technical Support Organigation,( WebSphere Application Server for z/OS and OS/390 Version 4.0, Chapter 5-7.*

(Continued)

*Primary Examiner*—Tuan Q Dam
*Assistant Examiner*—Thuy Dao
(74) *Attorney, Agent, or Firm*—Schwegman, Lundberg & Woessner, P.A.

(57) ABSTRACT

A system and method are described for deploying non-J2EE containers on a J2EE server. In one embodiment, non-J2EE containers are created and deployed on the J2EE server in communication with J2EE containers already deployed on the J2EE server.

15 Claims, 15 Drawing Sheets

U.S. PATENT DOCUMENTS

| | | | |
|---|---|---|---|
| 2003/0018694 A1 | 1/2003 | Chen et al. | |
| 2003/0018832 A1 | 1/2003 | Amirisetty et al. | |
| 2003/0046639 A1 | 3/2003 | Fai et al. | |
| 2003/0050932 A1* | 3/2003 | Pace et al. | 707/100 |
| 2003/0061247 A1 | 3/2003 | Renaud | |
| 2003/0093402 A1* | 5/2003 | Upton | 707/1 |
| 2003/0154266 A1 | 8/2003 | Bobick et al. | |
| 2003/0191803 A1 | 10/2003 | Chinnici et al. | |
| 2003/0204645 A1 | 10/2003 | Sharma et al. | |
| 2003/0236923 A1 | 12/2003 | Jeyaraman et al. | |
| 2004/0068731 A1 | 4/2004 | Davis et al. | |
| 2004/0078495 A1 | 4/2004 | Mousseau et al. | |
| 2004/0078719 A1 | 4/2004 | Grucci et al. | |
| 2004/0139154 A1* | 7/2004 | Schwarze | 709/203 |
| 2004/0148183 A1 | 7/2004 | Sadiq | |
| 2004/0148370 A1 | 7/2004 | Sadiq | |
| 2005/0049938 A1* | 3/2005 | Venkiteswaran | 705/27 |
| 2005/0080801 A1 | 4/2005 | Kothandaraman et al. | |
| 2005/0165910 A1* | 7/2005 | Kilian | 709/219 |
| 2005/0262189 A1 | 11/2005 | Mamou et al. | |
| 2005/0262477 A1 | 11/2005 | Kovachka-Dimitrova et al. | |
| 2005/0278274 A1 | 12/2005 | Kovachka-Dimitrova et al. | |

OTHER PUBLICATIONS

"Performance and scalability of EJB applications", Cecchet et al., Nov. 2002, pp. 246-261, <http://delivery.acm.org/10.1145/590000/582443/p246-cecchet.pdf>.*

"Extending a J2EE™ server with dynamic and flexible resource management", Jordan et al., Oct. 2004, pp. 439-458, <http://delivery.acm.org/10.1145/1050000/1045689/p439-jordan.pdf>.*

"How scalable is J2EE technology?", Brebner et al., May 2003, pp. 1-6, <http://delivery.acm.org/10.1145/780000/773139/p4-brebner.pdf>.*

""Dreamweaver MX 2004 Using Dreamweaver"", *Macromedia, Published*: Sep. 10, 2003, pp. 1, 2, 59-61.

Orfali, Robert, "Client/Server Programming with JAVA and CORBA Second Edition", by Robert Orfali et al, (1998), pp. 1-230.

Final Office Action for U.S. Appl. No. 10/853,374, Mailed Jan. 28, 2009, 13 pages.

Final Office Action for U.S. Appl. No. 10/854,729, Mailed Mar. 5, 2009, 12 pages.

* cited by examiner

DEPLOYING A VARIETY OF CONTAINERS IN A JAVA 2 ENTERPRISE EDITION-BASED ARCHITECTURE

BACKGROUND

1. Field of the Invention

This invention relates generally to the field of deployment. More particularly, an embodiment relates to a system and method for deploying a variety of containers in Java 2 Enterprise Edition-based architecture.

2. Description of the Related Art

Traditional client-server systems employ a two-tiered architecture such as that illustrated in FIG. 1A. Applications 102 executed on the client side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the Java 2 Platform, Enterprise Edition™ (J2EE) standard, the Microsoft .NET standard and/or the Advanced Business Application Programming (ABAP) standard developed by SAP AG.

For example, in a J2EE environment, such as the one illustrated in FIG. 1C, the business layer 122 of FIG. 1B is to handle the core business logic of the application having Enterprise JavaBean™ (EJB or enterprise bean) components with support for EJB containers 134. While the presentation layer 121 of FIG. 1B is responsible for generating servlets and Java ServerPages™ (JSP or JSP pages) interpretable with support for Web containers 132 by different types of browsers at the client 125 via a web server 136 a network 103 (e.g., Internet or intranet).

The J2EE engine 130 is a tool commonly used in software development and deployment today. Generally, using the J2EE engine 130 reduces the costs and complexity associated with developing multi-tier enterprise services. Another advantage of J2EE engine 130 is that it can be relatively rapidly deployed and enhanced as the need arises. The J2EE engine 130 is currently used in many large-scale application development and deployment projects for these reasons.

However, as application development projects grow larger and are diversified, deployment of applications becomes increasingly important. For example, it is useful to have an improved deployment service and management, including a variety of containers, application interfaces, transaction management and modules, notification and information status system, resource pooling, and security checks.

SUMMARY

A system and method are described for deployment of non-J2EE containers on a J2EE server. In one embodiment, one or more non-J2EE containers are created and are then deployed on to a J2EE server. The deployment of the non-J2EE containers includes deploying the non-J2EE containers on the J2EE server such that the non-J2EE containers are in communication with the J2EE containers that are already deployed on the J2EE server.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1A:
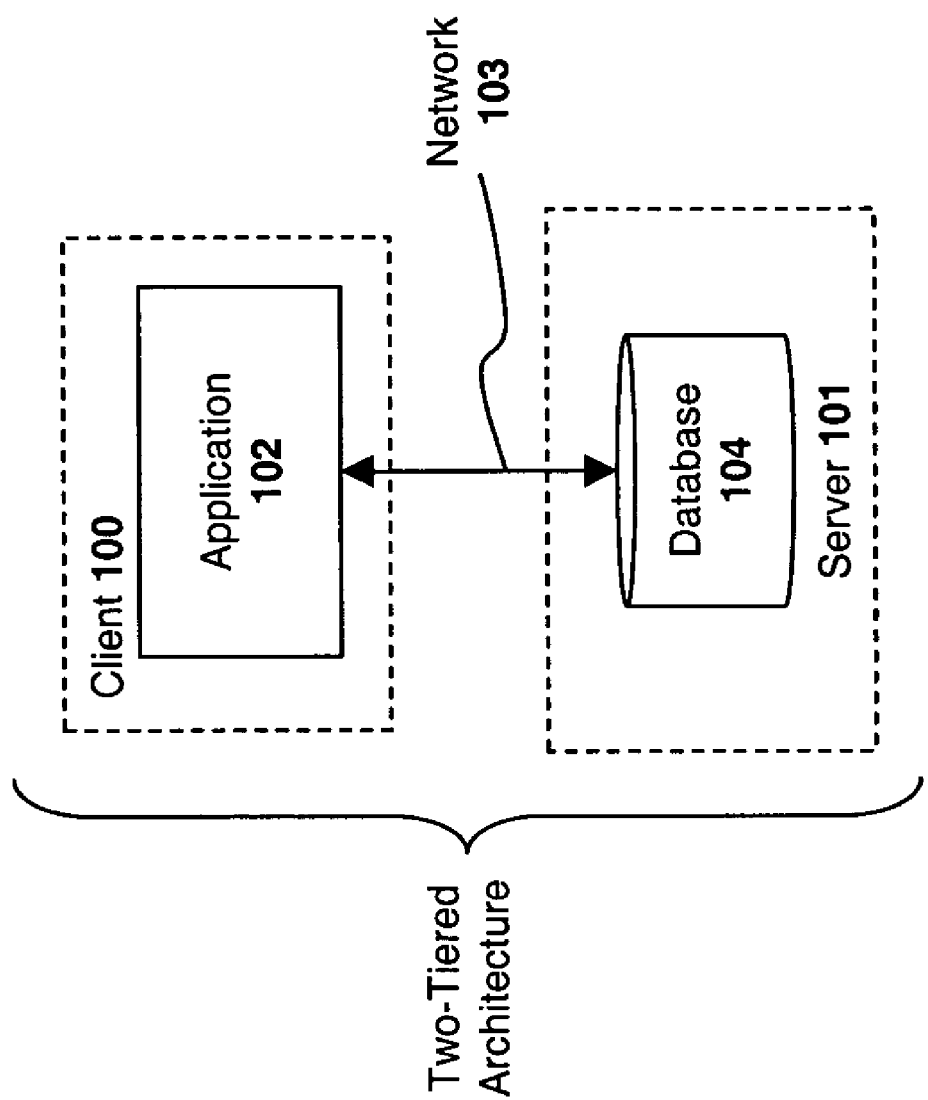
FIG. 1A is a block diagram illustrating a prior art two-tier client-server architecture.
Figure 1B:
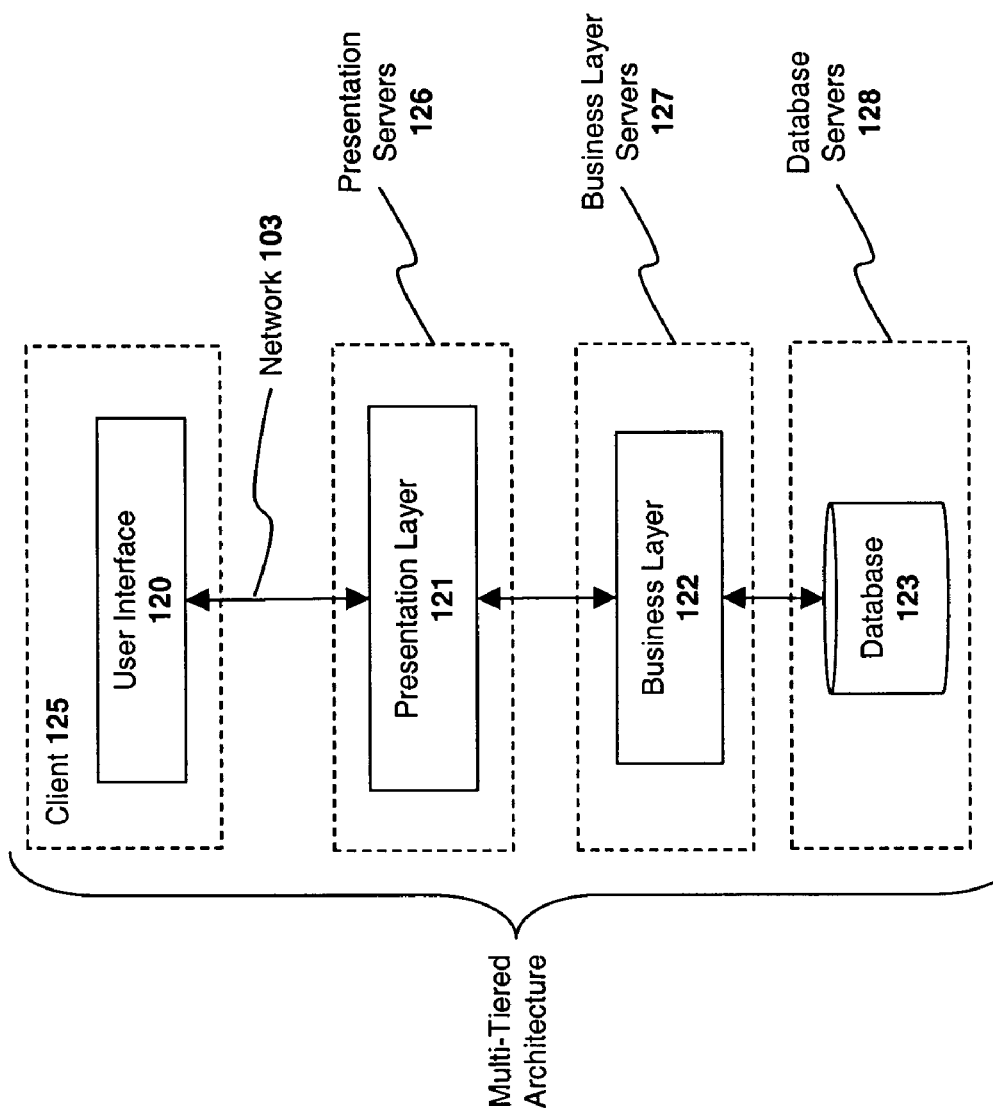
FIG. 1B is a block diagram illustrating a prior art multi-tier client-server architecture.
Figure 1C:
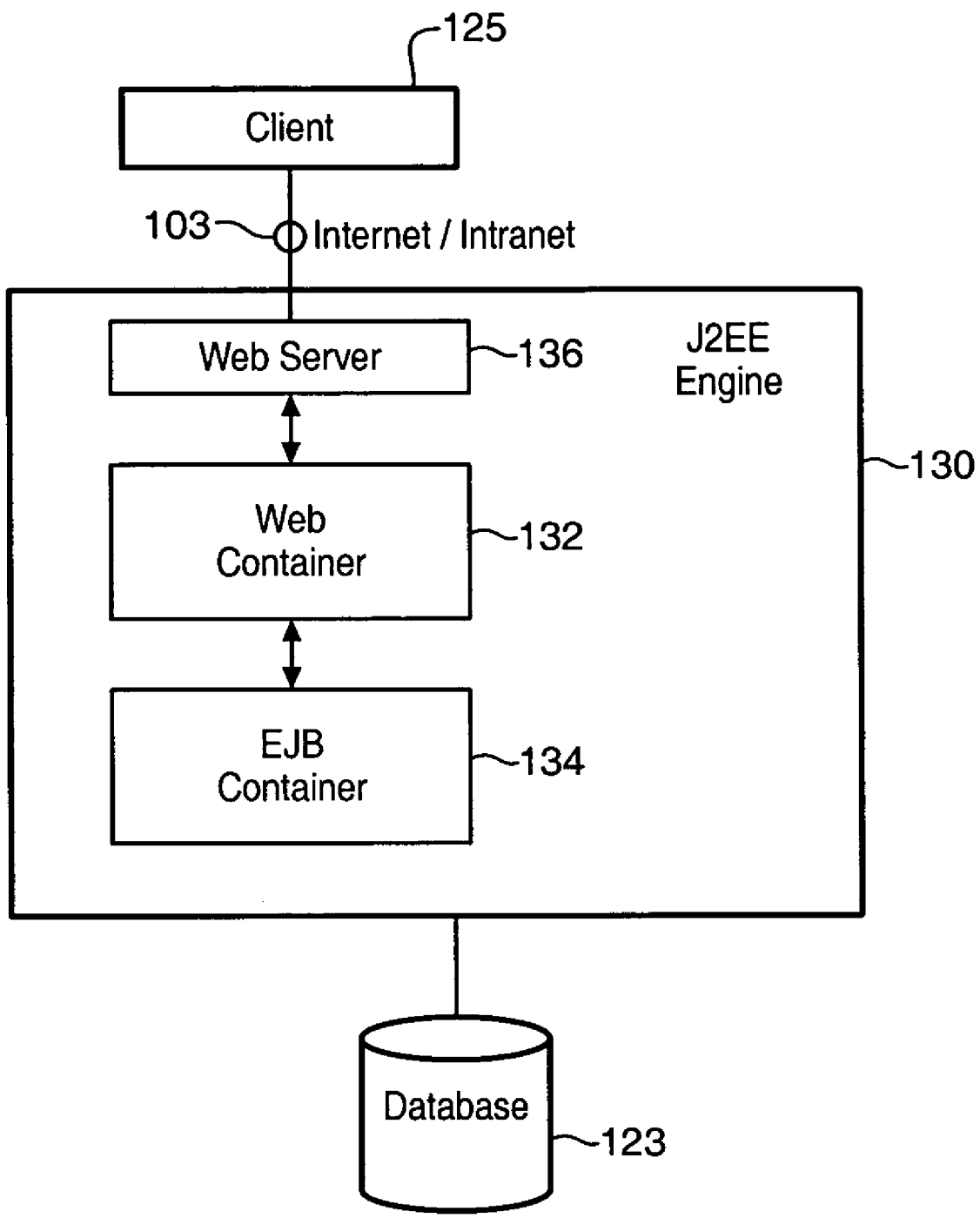
FIG. 1C is a block diagram illustrating a prior art J2EE environment.

Described below is a system and method for deploying J2EE containers and non-J2EE containers on a J2EE server in a J2EE architecture. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

Figure 2:
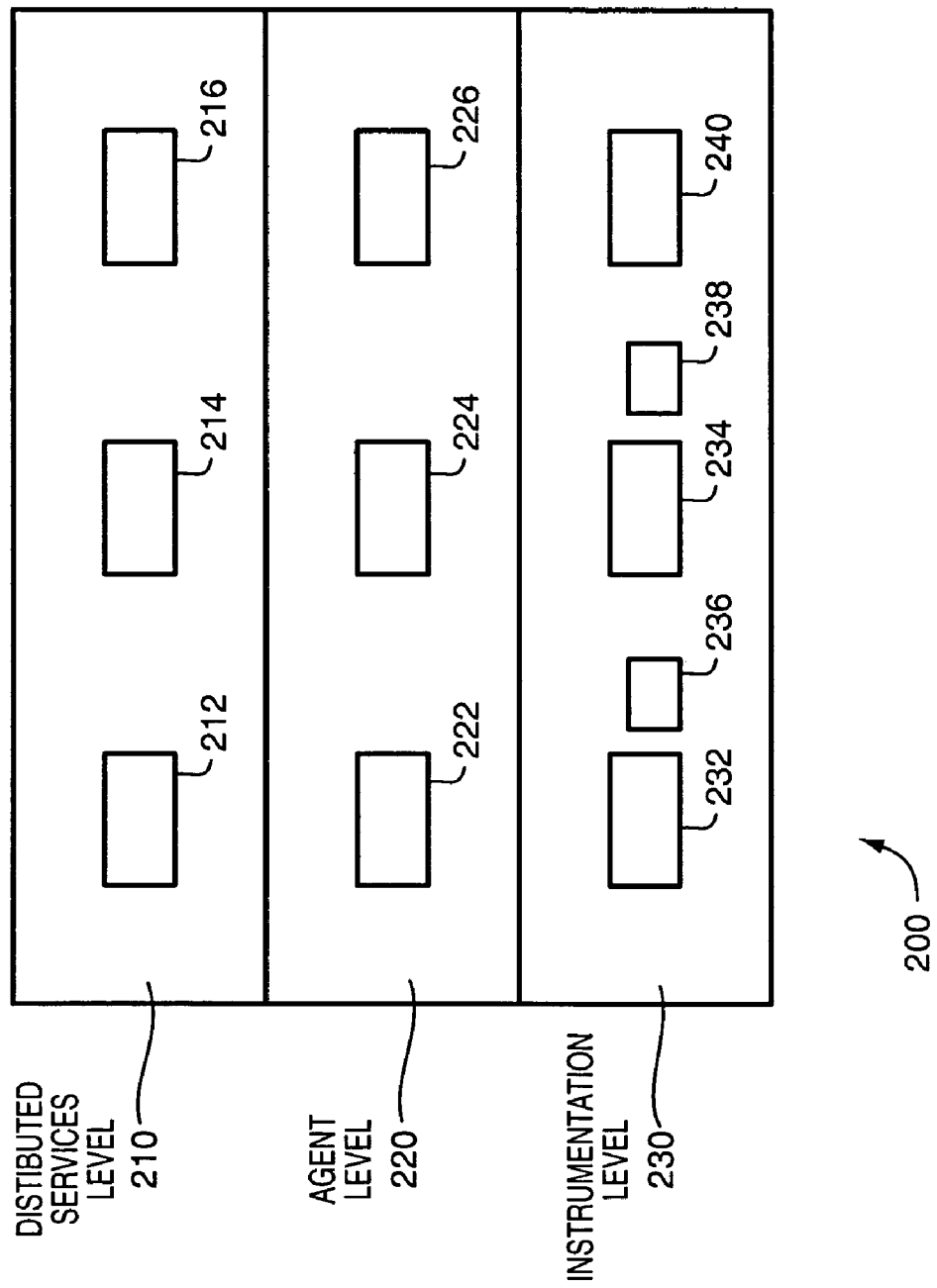
FIG. 2 is a block diagram illustrating an embodiment of a Java management architecture in which an embodiment of the present invention may be implemented.

FIG. 2 is a block diagram illustrating an embodiment of Java management architecture (JMA) 200 in which an embodiment of the present invention may be implemented. The illustrated embodiment of JMA 200 is based on Java Management Extensions (JMX). The JMA 200 includes three layers or levels 210, 220, 230, including a distributed services level (or manager or user or client level) 210, an agent level (or application level) 220, and an instrumentation level (or database level) 230. Some or all of the elements at each of levels of the JMA 200 may be, directly or indirectly, interconnected via a network (e.g., a Local Area Network (LAN)). Alternative embodiments of the JMA 200 may include more or fewer levels.

The distributed services level 210 serves as an interface between the JMA 200 and one or more users or clients. As illustrated, the distributed services level 210 includes one or more user terminals 212-214. One or more of the user terminals 212-214 to collect and gather user input and send it to the agent level 220 over a network connection. Network connection may be a wired or wireless connection to a LAN, a Wide Area Network (WAN), a Metropolitan Area Network (MAN), an intranet, and/or the Internet. Distributed services level terminals 212-214 include personal computers, notebook computers, personal digital assistants, telephones, and the like. According to one embodiment in which the network connection connects to the Internet, one or more of the user terminals 212-214 may include a Web browser (e.g., Internet Explorer or Netscape Navigator) to interface with the Internet.

According to one embodiment, the distributed services level 210 also includes management applications 216, such as a JMX-compliant management application, a JMX manager, and/or a proprietary management application. The management applications 216 also include one or more graphical management applications, such as a visual administrator, operating to, for example, retrieve and display information received from the agent level 220 and/or the instrumentation level 230.

The visual administrator includes a monitor viewer to display such and other information. The monitor viewer may be GUI-based or Web-based monitor viewer. Management applications 216 may include third party tools including a file system to store the information. The distributed services level 210 includes the CCMS system described above.

The agent level 220 includes one or more application servers 222-226. An application server may refer to a computing device that performs data processing. The agent level 220 also includes a computing device (e.g., a dispatcher) to perform load balancing among application servers 222-226. According to one embodiment in which the agent level 220 exchanges information with the distributed services level 210 via the Internet, one or more of the application servers 222-226 include a Web application server. According to one embodiment, the application servers 222-226 are implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. In one embodiment, the management techniques described herein are used to manage resources within a "cluster" of server nodes. An exemplary cluster architecture is described below with respect to FIGS. 10-11. However, the underlying principles of the invention are not limited to any particular application server architecture.

The applications servers 222-226 may include one or more dedicated Java Managed Bean (MBean or managed bean) servers having agent services. According to one embodiment, for and at each Java virtual machine (JVM) with managed resources, there may be one or more agents operating at the agent level 220. The one or more agents include one or more MBean servers, agent services, a set of MBeans, one or more connectors, and/or one or more protocol adaptors. An MBean Server includes a registry for MBeans and acts as a single entry point for calling MBeans in a uniform fashion from management applications at other JVMs.

The instrumentation level 230 provides a data storage medium for the JMA 200. As illustrated, according to one embodiment, the instrumentation level 230 includes one or more database management systems (DBMS) 232-234 and data sources 236-238. According to one embodiment, the data sources 236-238 may include databases and/or other systems capable of providing a data store. Furthermore, the instrumentation level 230 includes one or more hosts including one or more resources having MBeans, such as instrumentation MBeans. The instrumentation level 230 may make Java objects available to management applications 216. The Java objects instrumented according to the JMX-standard may include MBeans. The resources represented by MBeans include managed resources 240, including a kernel, a server component, or the like. MBeans may expose a management interface including constructors, attributes, operations, and notifications.

Figure 3:
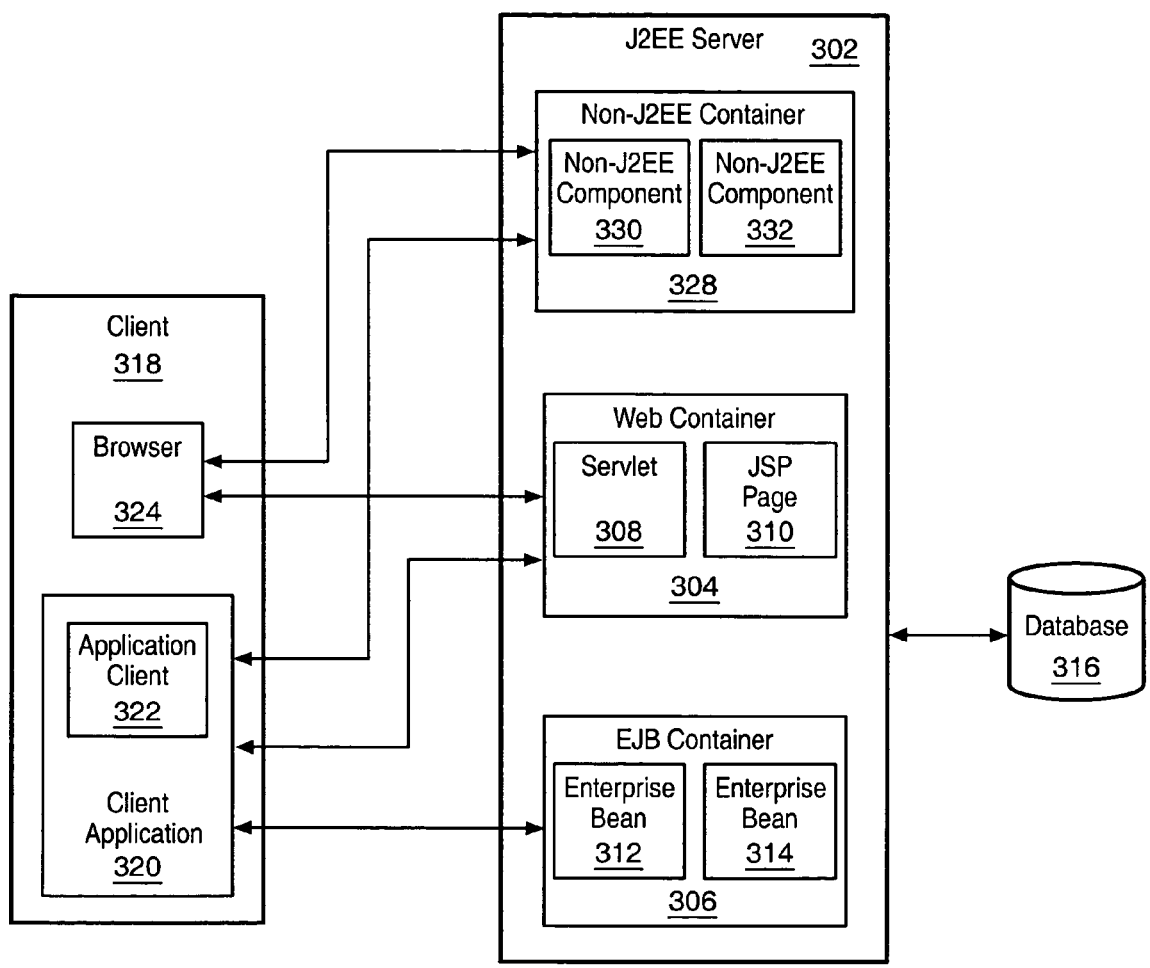
FIG. 3 is a block diagram illustrating an embodiment of a J2EE architecture having J2EE and non-J2EE containers.

FIG. 3 is a block diagram illustrating an embodiment of a J2EE architecture 300 having J2EE and non-J2EE containers 304-306, 328. The J2EE architecture 300 includes a J2EE server 302 to provide the runtime portion of a J2EE product. The J2EE server 302, in the illustrated embodiment, includes J2EE containers, such as a Web container 304 and EJB container 306. Typically, a Web container 304 is responsible for managing the execution of JSP page and servlet components 308-310 for J2EE applications. The Web container 304 is used to implement the Web component contract of the J2EE architecture 300. This contract specifies a runtime environment for Web components that includes security, concurrency, life-cycle management, transaction, deployment, and other services. The JSP page 310 refers to a text-based document using fixed template data and JSP elements that describe how to process a request to create a response. The servlet 308 refers to Java program that extends the functionality of a Web server, generating dynamic content and interacting with Web applications using a request-response paradigm.

Typically, an EJB container 306 is responsible for managing the execution of enterprise beans for J2EE applications. The EJB container 306 is used for implementing the EJB component contract of the J2EE architecture 300. The contract specifies a runtime environment for enterprise beans that includes security, concurrency, life cycle management, transactions, deployment, naming and other services. EJBs 312-314 refer to component architecture to develop and deploy object-oriented, distributed, enterprise-level applications. EJB-written applications are scalable, transactional and secure.

On the client side 318, the J2EE architecture 300 includes a client application 320 to support application client components. The client application 320 is further to support an application client 322 and a browser 324. The application client 322 refers to a client component that executes into a standard Java applications or desktop applications in the JVM and has access to various J2EE services and interfaces. The browser 324 refers to a Web browser that is typically part of the applet container which includes support for the applet programming module. The applet container typically includes applets which are components that execute in a browser 324. It is contemplated, on the client side 318, the client application 320 and other elements may or may not be J2EE based.

The server-side J2EE containers 304-306 provide underline J2EE services for J2EE components 308-314. Having a J2EE container 304-306 between the components 308-314 and services (and interfaces) allows the containers 304-306 to transparently inject the services defined by the components' deployment descriptors, such as declarative transaction management, security checks, state management, and resource pooling. Because there is no need to develop these J2EE services, an administrator can concentrate on other problems and aspects of development and deployment. The J2EE services are further discussed in FIG. 4.

The containers 304-306 provide J2EE services by providing runtime support for J2EE application components 308-314 and provide a federated view of the underlying J2EE application programming interfaces (APIs) or services to the application components 308-314. The containers 304-306 serve as an interface between a component 308-314 and services that support the component 308-314. For example, before an enterprise bean 312-314 can be executed, it may be assembled into a J2EE application and deployed into its container 306. The runtime environment provided by the containers 304-306 is Java Compatible™ runtime environment, as defined by the J2EE standard. The applet container may se the Java Plugin product provide this runtime environment or it may be provided natively.

The J2EE server 302, according to one embodiment, also contains a non-J2EE container 328 having non-J2EE components 330, 332 to assemble a non-J2EE application. For example, the non-J2EE container 328 includes an SAP container and similarly, the non-J2EE components 330-332 may include SAP components. The SAP container 328 and the SAP components 330-332 may be used to assemble an SAP application. Examples of SAP application components include Portlets of Enterprise Portals and WebDynPro. Having one or more non-J2EE containers 328 provide a relatively extended and adaptive J2EE architecture 300 to include non only the standard J2EE applications, components, and functionalities, but also non-J2EE applications, components, and functionalities. Stated differently, using the J2EE architecture 300 having only the J2EE server (or engine) 302, both the J2EE-based applications and non-J2EE based applications are provided using the J2EE and non-J2EE containers 304-306, 328 and their components 308-314, 330-332.

Each of the non-J2EE components 330-332 may be deployed in a specific non-J2EE container 328. The life cycle of every component 330-332 deployed in the container 328 may be part of the life cycle of the entire application that is composed of J2EE and non-J2EE components 330-332. As with the J2EE containers 304-306, the behavior of the non-J2EE container 328 may also be unified in accordance with the life cycle of the application. The application, according to one embodiment, as composed entity is managed by a deploy service. The deploy operations for an application, which define the life cycle of the application, include deployment, start, stop, update and remove. According to one embodiment, a container API may be employed to unify the life cycle and the way the various application components 308-314, 330-332 are processed in both the J2EE containers 304-306, 320 and non-J2EE containers 328.

According to one embodiment, working an interface between the deploy service and the containers 304-306, 328, the container API is used to perform a high level distribution and management of activities in the J2EE architecture 300. For example, a non-J2EE container 328 may be implemented using a container interface (e.g., <com.sap.engine.services­.deploy.container.ConatinerInterface>), such as a container API. The container management of the container API may then be used for registration and unregistration of the containers 304-306, 328 during start and stop of service, respectively (e.g., <com.sap.engine.services.deploy­.container.ContainerManagement>). Similarly, container information class may be used to identify the container 304-306, 328 and their deployed components 308-314, 330-332 using the bidirectional communication between the containers 304-306, 328 and the deploy service. Other classes and interfaces associated with the container API may be used to manage other deployment operations with various other containers. It is contemplated, similar container services and interfaces may be associated with client application 320.

Figure 4:
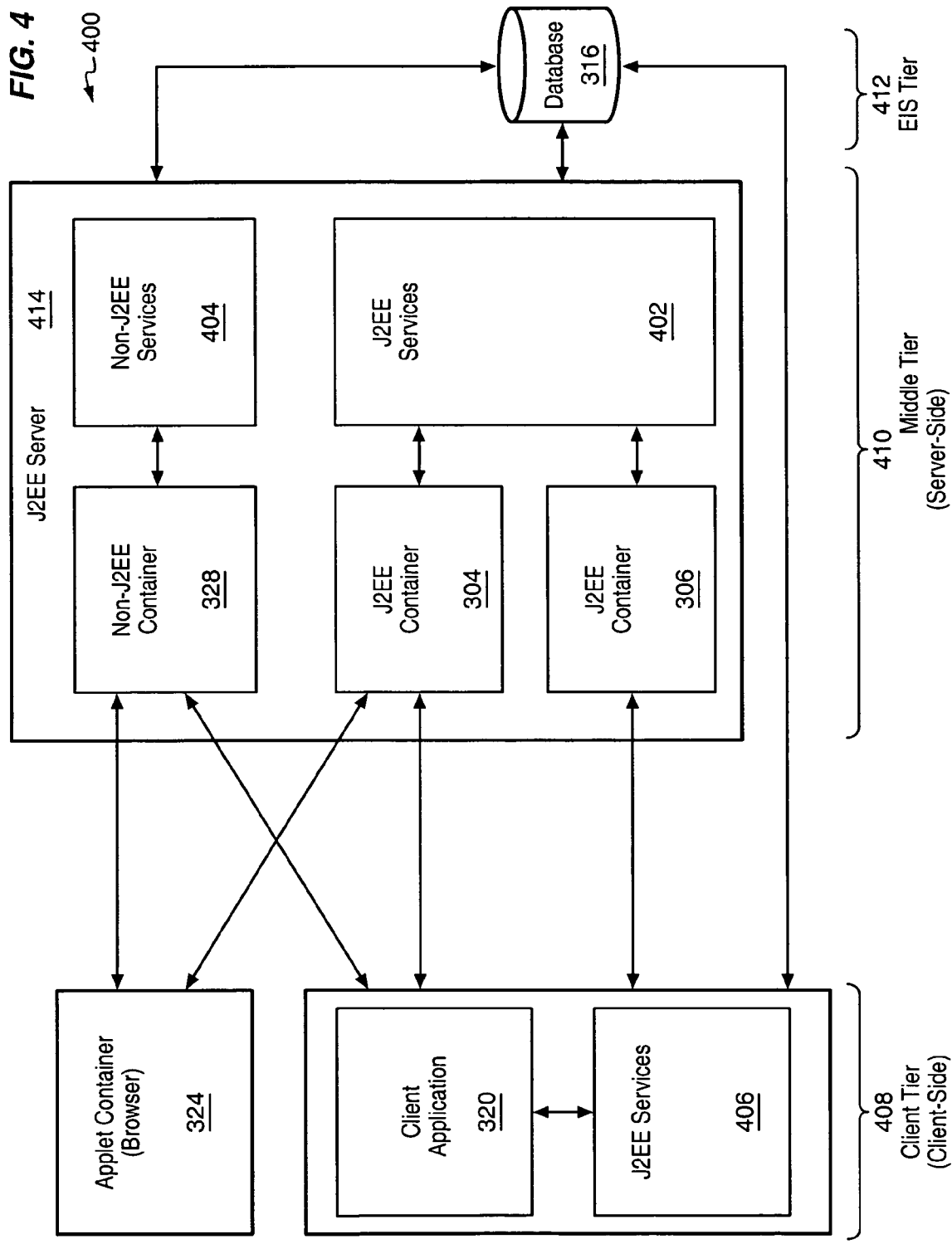
FIG. 4 is a block diagram illustrating an embodiment of a multi-tiered J2EE architecture having a J2EE server employing J2EE and non-J2EE containers and services.

FIG. 4 is a block diagram illustrating an embodiment of a multi-tiered J2EE architecture 400 having a J2EE server 414 employing J2EE and non-J2EE containers 304-306, 328 and services 402-404. As illustrated, the multi-tiered J2EE architecture 400 includes a J2EE server (or engine) 414 having J2EE containers 304-306 on the server-side, and more particularly, in the middle tier 410. The middle tier 410 includes the presentation logic (e.g., Web tier) and business logic (e.g., business tier). Examples of the server-side J2EE containers 304-306 include Web containers and EJB containers. The client tier 408 includes a client application 320 to provide J2EE services 406.

The server-side J2EE containers 304-306 and the client application 320 are, directly or indirectly, in communication with the database 316, located at the Enterprise Information Systems (EIS) tier 412 of the multi-tiered J2EE architecture 400. The database 316 may include one or more database servers, EJB servers, old systems, and mySAP components. The client application 320 may include standard a J2EE application to help facilitate the running of applications in standalone JVMs. Furthermore, the clients may access one or more of the applications via standalone Java programs and programs that help access an application via, for example, using Internet Inter-Object Request Broker Protocol (IIOP)/ Common Object Request Broker Architecture (COBRA) written using any programming language (e.g., –C, C, and C++).

The J2EE containers 304-306 in the middle tier 420 are associated with various J2EE services and APIs 402, examples of which, include Java Naming Directory Interface (JNDI), Java Database Connectivity (JDBC), J2EE connector Architecture (JCA), Remote Invocation (RMI), Java Transaction API (JTA), Java Transaction Service (JTS), Java Message Service (JMS), Java Mail, Java Cryptography Architecture (JCA), Java Cryptography Extension (JCE), and Java Authentication and Authorization Service (JAAS). The J2EE services 402 further include EJB_service, servlet_JSP, application_client_service, connector_service to provide (J2EE containers 304-306, 320, namely) EJB containers, Web containers, application client containers, and connector containers, respectively. It is contemplated the client application 320 may also be associated with a set of J2EE services and APIs 406. However, each of the containers 304-306 may be associated with a different set of J2EE services. For example, on the client-side 408, the client application 320 may be associated with different J2EE services 406 than the J2EE containers 304-306 associated with the J2EE services 402 on the server-side 410. Furthermore, the client-side 408 may or may not be J2EE-based.

According to one embodiment, as illustrated, the J2EE server 414 includes a non-J2EE container 328 and a set of non-J2EE services and interfaces 404. An example of a non-J2EE container 328 and non-J2EE services 404 may include an SAP container and a set of SAP services and APIs, respectively. The non-J2EE services 404 include dbpool service, JMS_connector service, Webservices service, Webdynpro service, log_configurator service, and Java monitoring service. According to one embodiment, non-J2EE components deployed in the non-J2EE container 328 may be used to manage non-J2EE applications (e.g., SAP applications). In one embodiment, the management of the non-J2EE applications is performed during and after deployment, while the assembly of the non-J2EE applications is conducted prior to deployment. According to one embodiment, both the J2EE and non-J2EE containers 304-306, 328 may have access to the J2EE and non-J2EE services 340-342.

According to one embodiment, some of the non-J2EE services 404 may include parallel or similar services to the J2EE services 402. The container API may be used to facilitate registration, unregisteration, implementation, and management of not only the J2EE containers 304-306, but also one or more non-J2EE containers 328 on the J2EE server 414. Using a common container API, both the standard J2EE containers 304-306 and the non-J2EE containers 328 may be deployed on the server side 410, and the J2EE server 414, as whole, regards them as the same. Stated differently, when deploying a non-J2EE container 328, the specific details in the implementation and logic of the non-J2EE container 328 may be kept hidden from the J2EE server 414 so all J2EE and non-J2EE containers 304-306, 328 are to be recognized and regarded the same way as part of the J2EE engine architecture 400.

The container API, according to one embodiment, is encapsulated in a service 402-404. This is to, for example, expand the J2EE architecture 300 to provide a relatively easy implementation and deployment of services, and to provide one or more non-J2EE containers 328, which in turn can deploy any non-J2EE components with relative ease using the same infrastructure. The container API may be represented by an interface defined as a development component with the name, e.g., <container_api>. The implementation of container API may be performed using the deploy service.

According to one embodiment, the deploy service may be used as an entry point for extending the J2EE architecture 400 and for enhancing the functionality of the J2EE server 414 by deploying the non-J2EE containers 328 along with the non-J2EE containers 304-306. The deploy service may also be used for the deployment of applications, standalone modules (containing both J2EE and non-J2EE components), service, and libraries.

Figure 5:
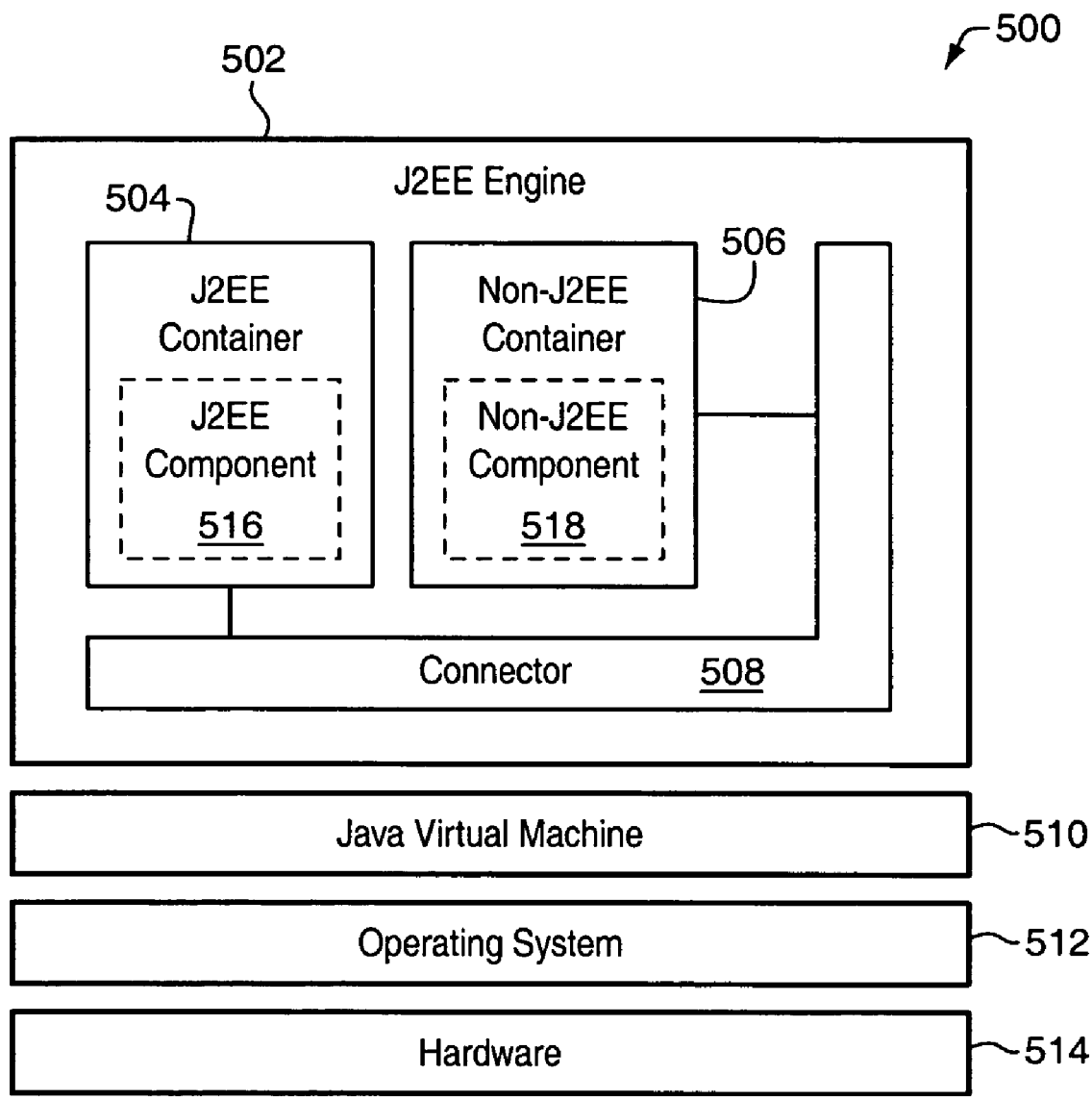
FIG. 5 is a block diagram illustrating a J2EE architecture having J2EE and non-J2EE containers residing on a J2EE engine.

FIG. 5 is a block diagram illustrating a J2EE architecture 500 having J2EE and non-J2EE containers 504-506 residing on a J2EE engine 502. In the illustrated embodiment, the J2EE engine (or server) 502 includes both a J2EE container 504 and a non-J2EE container 506. The J2EE container 504 manages a J2EE component 516, which may be part of a J2EE application. The non-J2EE container 506 manages a non-J2EE component 518, which may be part of a non-J2EE application. The term non-J2EE may refer to a non-J2EE standard element, such as a container 506, component 518, and application, and may be synonymous with SAP AG.

The J2EE architecture 500 further includes connectors 508 to provide standard services and APIs to connect the J2EE server 502 and its elements with the rest of the J2EE architecture 500. The connectors 508 may be J2EE or non-J2EE based. The J2EE architecture 500 also includes a JVM 510 to process platform-independent bytecode into platform-specific native code or binary machine code at runtime. The binary machine codes are executed on a hardware 514 using an operating system 512. The operating system 512 may include Microsoft Windows®, Macintosh, Unix, Linux, and the like. The hardware 514 may include a computer processing unit, a storage device, a random access memory, and the like.

Figure 6:
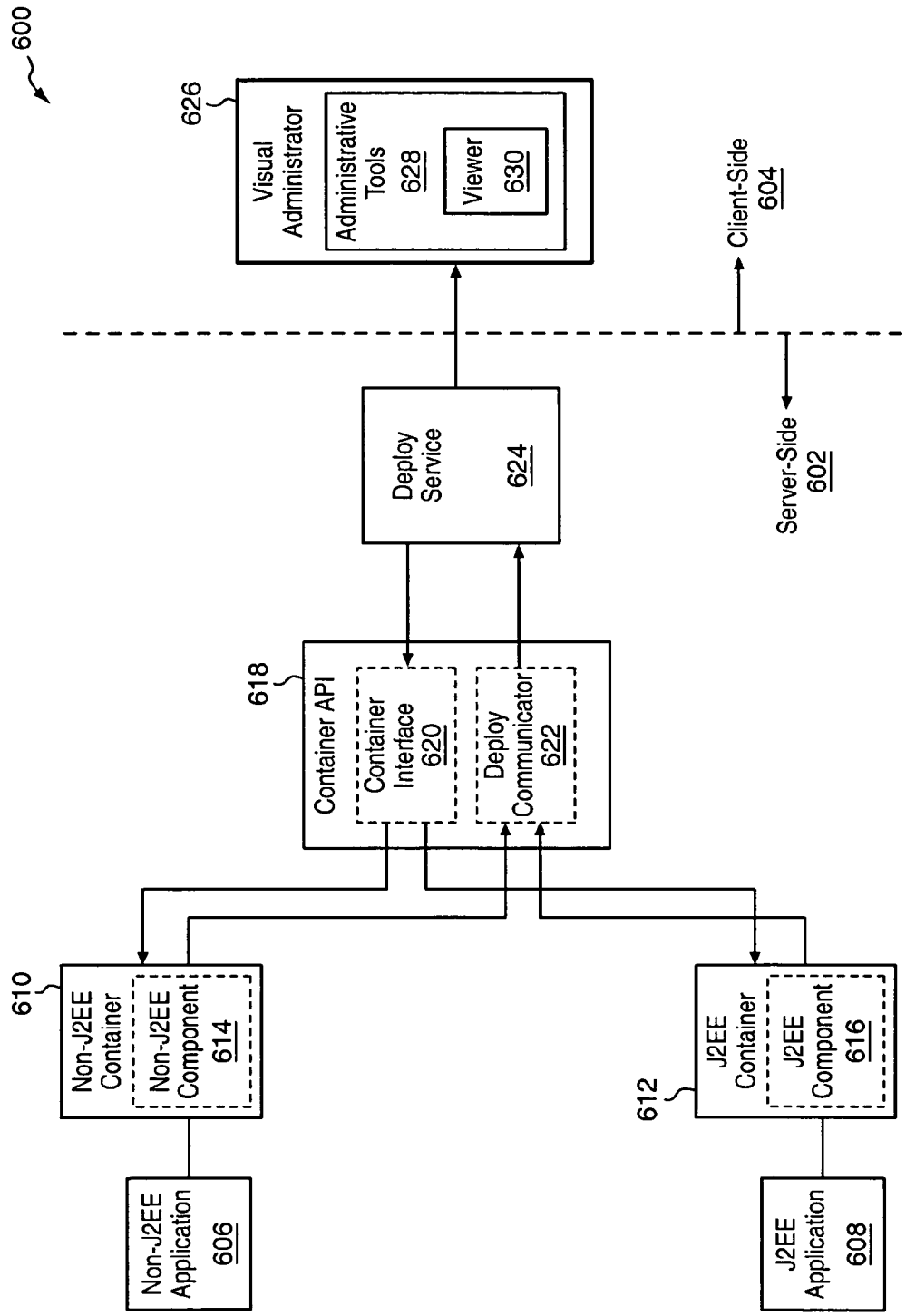
FIG. 6 is a block diagram illustrating a J2EE architecture having a deploy service.

FIG. 6 is a block diagram illustrating a J2EE architecture 600 having a deploy service 624. According to one embodiment, the deploy service 624 serves to extend and enhance the J2EE architecture 600 and its functionalities. The deploy service 624 along with the container API (e.g., SAP container API) 618 help facilitate the deploying of various deployable entities, including J2EE and non-J2EE components 614-616 using J2EE and non-J2EE containers 610-612, respectively. The container API 618 is represented on the server as an interface defined as a development component.

Serving as an entry point for expanding and enhancing the J2EE architecture 600, the deploy service 624 is also used for correct distribution of the deployable entities to their services/containers and a storage place. The storage place is retrieved from configuration manager in the database and the deploy service 624 is to facilitate the storage of all applications so that the containers 610-612 may rely on a consistent storage for the entire application. The application components 614-616 and standalone modules are managed by the containers 610-612, the libraries, services, and interfaces are managed by server's deploy context, which is located at a deeper level in the core of the server because these deployable components are used by applications 606-608 found on a higher level in the J2EE architecture 600. Stated differently, deploy service 624 is used to manage an entire application 606-608, the container 610-612 is used to manage the applications' components 614-616, and the deploy context is used to manage the server components, such as the libraries, services and interfaces. According to one embodiment, the deploy service 624 may obtain the deploy context using its application service context.

According to one embodiment, the container API 618 provides a container interface 620 that is implemented by container services associated with the containers 610-612 (e.g., <com.sap.engine.services.deploy-.container.ContainerInterface>). Such implementation is to facilitate the deploy service 624 to identify and process various actions on those containers 610-612 that are implemented according to a set of rules including the implementation of the container API 618 by container services. A container service may listen for the availability of the container interface by implementing a container event listener (e.g., <com.sap.engine.frame.container.event.ContainerEventListener>).

The container API 618 provides a container management for registration of containers 610-612 by container services when an event indicating the availability of the container API 618 (e.g., <container_api>) is received or listened to by a container service via the container event listener. The container service may then register the container 610-612 using container management. In contrast, when a container 610-612 is rendered not available that container 610-612 is unregistered using the container management (e.g., <com.sap.engine.services.deploy.container.ContainerManagement>). Stated differently, the container services are provided with an opportunity to register their corresponding containers 610-612 with the container API 618 and the deploy service 624 when the containers 610-612 become available and are ready to perform deployment operations. In contrast, the containers 610-612 may be unregistered when once they stop or become unavailable.

According to one embodiment, the container API 618 also includes deploy communicator 622 in combination with the container interface 620. The availability of the deploy communicator 622 allows the deploy service 624 and the containers 610-612 to communicate bi-directionally. Stated differently, using the container interface 620, the information flows from the deploy service 624 to the containers 610-612. Each of the containers 610-612 may obtain an instance of the deploy communicator 622 during its registration to communicate back with the deploy service 624.

Using the deploy communicator 622, the information may flow from the containers to the deploy service 624. Such information may include information relating to the status, requesting runtime information, initiating operations from containers 610-612, etc., flowing back to the deploy service 624. Such information allows the deploy service 624 to be more efficient by, for example, allowing the containers 610-612 to request to lock the application or changes that may occur due to some property changes in the container 610-612, or by having the deploy service 624 request the changes by update. Another example includes allowing a container 610-612 to stop its deployed applications in the container service stop method, since applications are usually consisting of more than one component and the deploy service 624 may know the entire configuration of an application.

According to one embodiment, the instance of container information (e.g., <container info>) including information for identification of a container 610-612 may have a set of properties with set/get methods. Some of the properties include: (1) determination of whether a container 610-612 is a J2EE container 612 (e.g., EJB, Web, application, client, resource adapter) or a non-J2EE container 610 (e.g., SAP container); (2) for J2EE containers 612, specification of the type of the components 616 deployed (e.g., String j2eeModuleName); (3) for non-J2EE containers 610, specification of the type of the components 614 deployed (e.g., String moduleName); (4) for specification of the priority of a container 610-612 (e.g., when an application is being deployed, stopped, and started), the deploy service 624 knows in what order to notify the concerned containers 610-612. During deployment and start of an application, the containers 610-612 having higher priority are notified first, and during stop of an application the containers 610-612 with lower priority are first notified (e.g., int priority); (5) specification of a container's unique name (e.g., String name); (6) specification of a set of extensions of files which represents components 614-616 deployed on the respective containers 610-612 (e.g., String [ ] fileExtentions); (7) specification of a set of names of files which represent components 614-616 deployed on the respective containers 610-612 (e.g., String [ ] filenames); (8) specification of the name of the service that provides the container (e.g., String serviceName); (9) determination of whether the container 610-612 supports the operation "single file update" (e.g., Boolean supportsSingleFileUpdate); and (10) specification of the kind of resource types that are supported by the container (e.g., String [ ] resourceTypes).

According to one embodiment, filenames and extensions may be used by the deploy service 624 for distribution of the deployable components 614-616 on the containers 610-612. The deploy service 624 may include a mechanism for automatic recognition of the container 610-612 to which the corresponding deploying components 614-616 may be distributed, in accordance with the filenames and extensions contained in the <container info> of each of the containers 610-612. For example, if a standalone module file has an extension Web ARchive (e.g., WAR or war) and the J2EE Web container has specified this extension in its <container info>, the deploy service 624 may distribute a WAR file to the Web container.

Figure 7A:
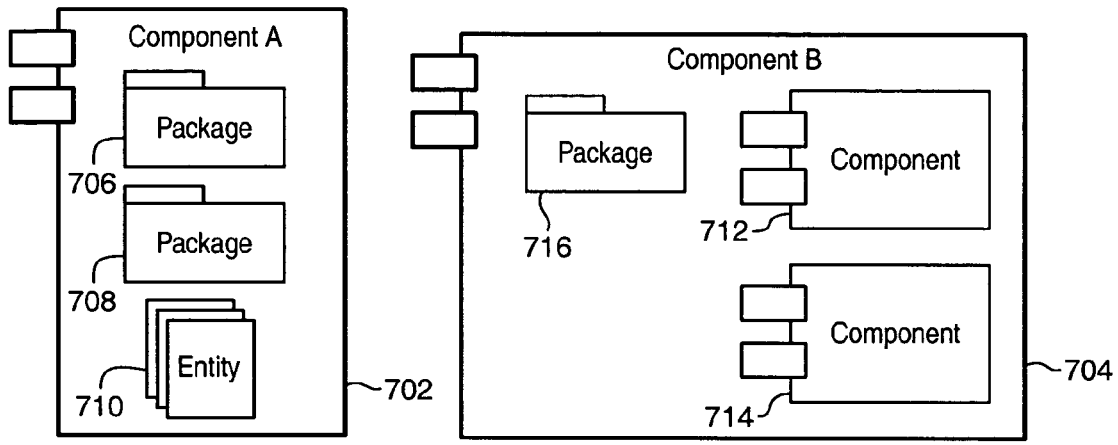
FIGS. 7A-7C are block diagrams illustrating an embodiment of a container API represented as a development component.
Figure 7B:
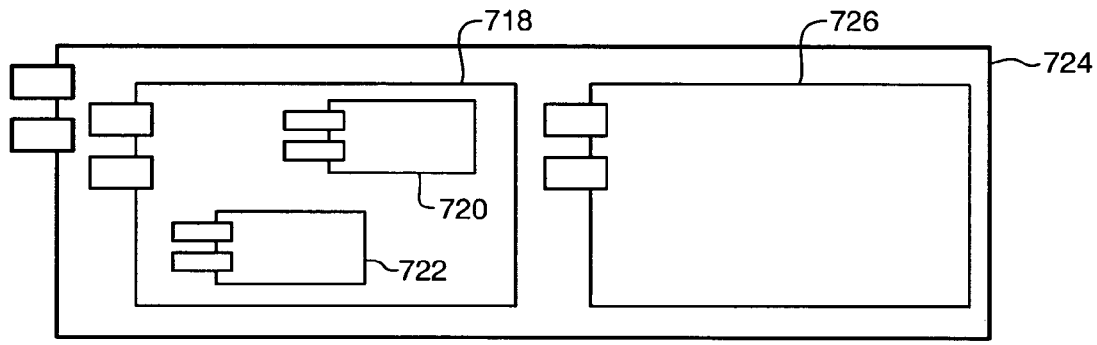
Figure 7C:
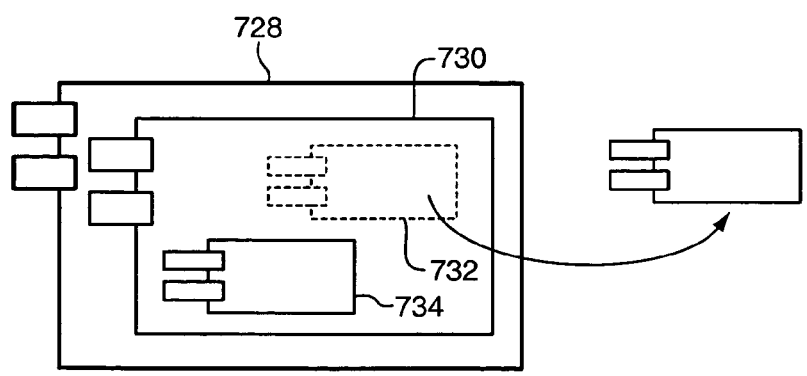

FIGS. 7A-7C are block diagrams illustrating an embodiment of a container API represented as a development component 702-704. According to one embodiment, the container API (e.g., SAP container API) may be represented by an interface defined as a development component 702-704 with the name "container_api" on the server. The development component 702-704 includes a container for arbitrary development entities, produced entities, inner development components. A development component 702-704 may simultaneously enclose entities of different types and technologies, and may represent the re-usable modules of software for developers.

A development entity may refer to something that contributes to a software product and is developed actively. Examples of development entities may include a Java source file, a WebDynpro view, a table definition, database content, and a JSP page. Typically, development entities are stored in some suitable "source" format in a versioning design time repository (DTR). A produced entity is something that may have been generated from development entities (or other produced entities) and may generate other produced entities. Examples of produced entities may include a Java class file, a library, and a deployable J2EE archive. Typically, produced entities are not stored in a versioning source repository (VSR).

According to one embodiment, the entities of a development component 702-704 may be organized in packages that behave similar to Java packages, but are not limited or restricted to Java entities. Packages may enclose entities of different types and technologies; however, not all entities of a development component 702-704 may belong to packages. Packages may define a unique namespace for entities and are used to arrangement entities in a physical or logical way within a development component 702-704.

Referring to FIG. 7A, it illustrates two exemplary development components A and B 702-704. Development component A 702 includes two packages 706-708 and a set of entities 710 that are not members of any of the packages 706-708. Component B 706 includes two components (or subcomponents) 712-714 and a package 716. An included (or inner or enclosed) component 712-714 belongs to the including component B 706.

FIG. 7B illustrates an inner development component 718 further decomposed into multiple components 720-722 to build a component hierarchy of arbitrary complexity. The component 718 resides inside a component 724, along with another component 726. The inclusion relations between components 718-726 are not static and may change over time. A development component 724 not enclosed in any other component is referred to as top-level component.

In one embodiment, a component may simultaneously become an including component and an included component 730. An included component 732, as illustrated in FIG. 7C, may be lost from its including component 732. Stated differently, the including component 732 is an internal component that is removed from a stack of nested components 732-734 in component 730 and further inside the top-level component 728. A development component, such as the top-level component 728, is referred to as black box, because nothing of its content may be visible outside, until the component 728 adopts a public interface. A state of a development entity is defined by a certain value of its content that is stable for a certain period of time. The difference between two consecutive states is called a change. The state of a development component (e.g., component A 702, may be implicitly derived from the states of its entities 710, its own declared attributes and dependencies.

Figure 8:
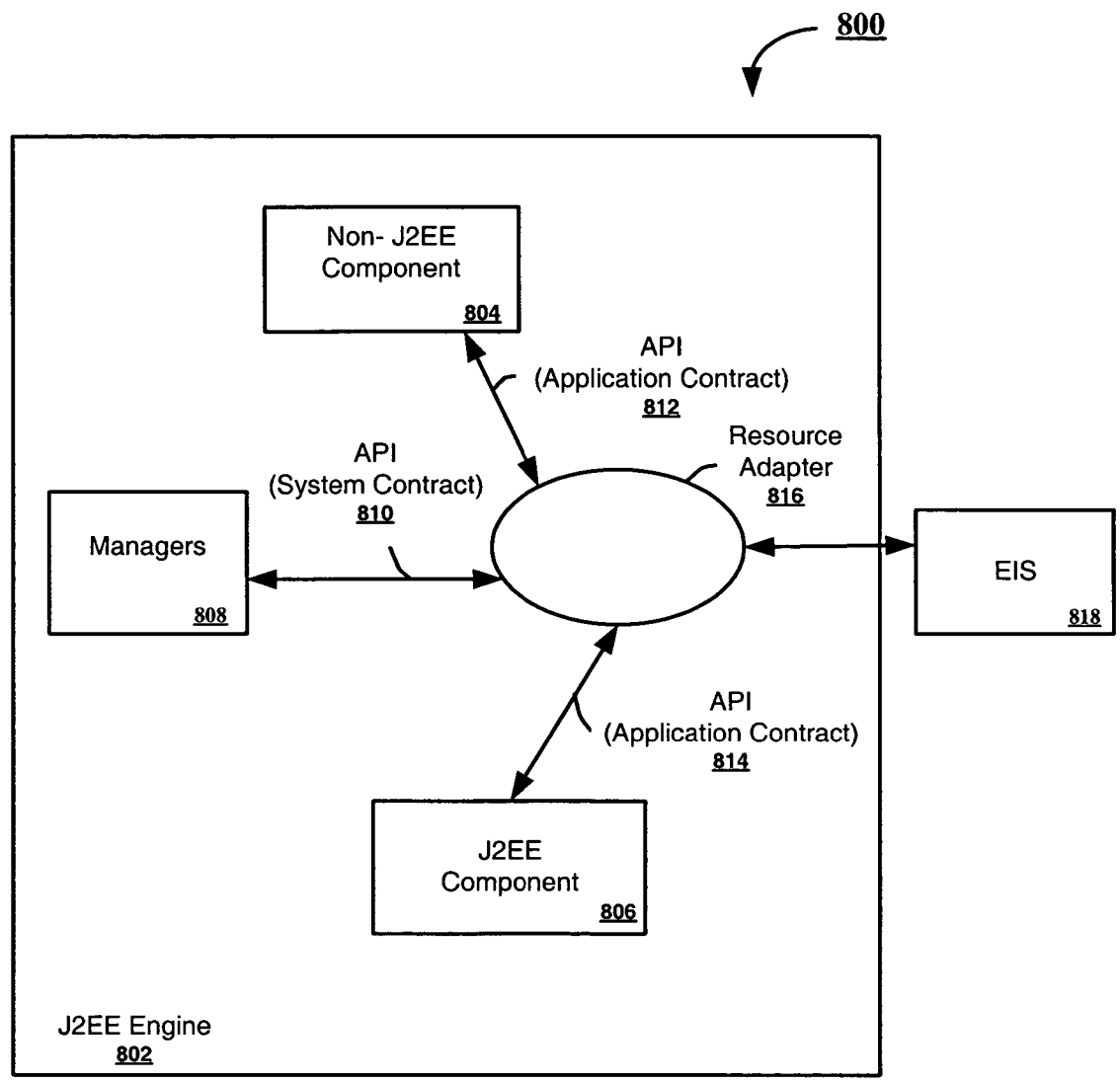
FIG. 8 is a block diagram illustrating an embodiment a J2EE connector architecture.

FIG. 8 is a block diagram illustrating an embodiment a J2EE connector architecture 800. According to one embodiment, J2EE architecture 800 enables J2EE components 806, such as enterprise beans, and non-J2EE components 804, such as SAP components, to interact with an enterprise information system (EIS) 818. The EIS software associated with the EIS 818 may include various systems, enterprise resource planning (ERP), mainframe transaction processing, and databases. The EIS 818 includes back-end database or data management components that run on the database server. The EIS 818 may further include persistent storages or databases, database servers, EJB servers, old systems, mySAP components, and the like. It is contemplated, not all J2EE components 806 or non-J2EE components 804 are required to have access to the database.

The J2EE connector architecture 800 may include a resource adapter 816, also referred to as a component, to provide connectivity to a specific EIS system 818. Resource adapters 816 are provided by EIS vendors. Furthermore, the J2EE connector architecture 800 may include J2EE and non-J2EE products to allow the resource adapter 816 to be plugged in to the platform implementation. According to one embodiment, J2EE and non-J2EE applications communicate with an EIS 818 via a resource adapter 816 which may be stored in a Resource Adapter Archive (RAR) file and deployed on a J2EE server, similar to an Enterprise ARchive (EAR) file of a J2EE application. Also, an RAR file may reside in an EAR file or it may exist as a separate file.

As illustrated, the J2EE connector architecture 800 may include application interfaces or contracts 812-814 and system interfaces or contracts 810 that are implemented by the resource adapter 816. The application contract 812-814 refers to an interface or API through which a J2EE component 806 or non-J2EE component 804 accesses the EIS 818. The system contract 810 refers to an interface or API that links the resource adapter 816 to various services, such as security, transaction, and connectivity, managed by the server.

In one embodiment, applications and their components can be described using the Development component model techniques. Using the features of the Development component model, such dependencies, visibility, embodiment, access control list, and public parts, both the J2EE and non-J2EE applications can be fully specified. In one embodiment, the Deploy service may read the applications that are described in terms of development component model and based on this information distribute the components to the containers.

Figure 9:
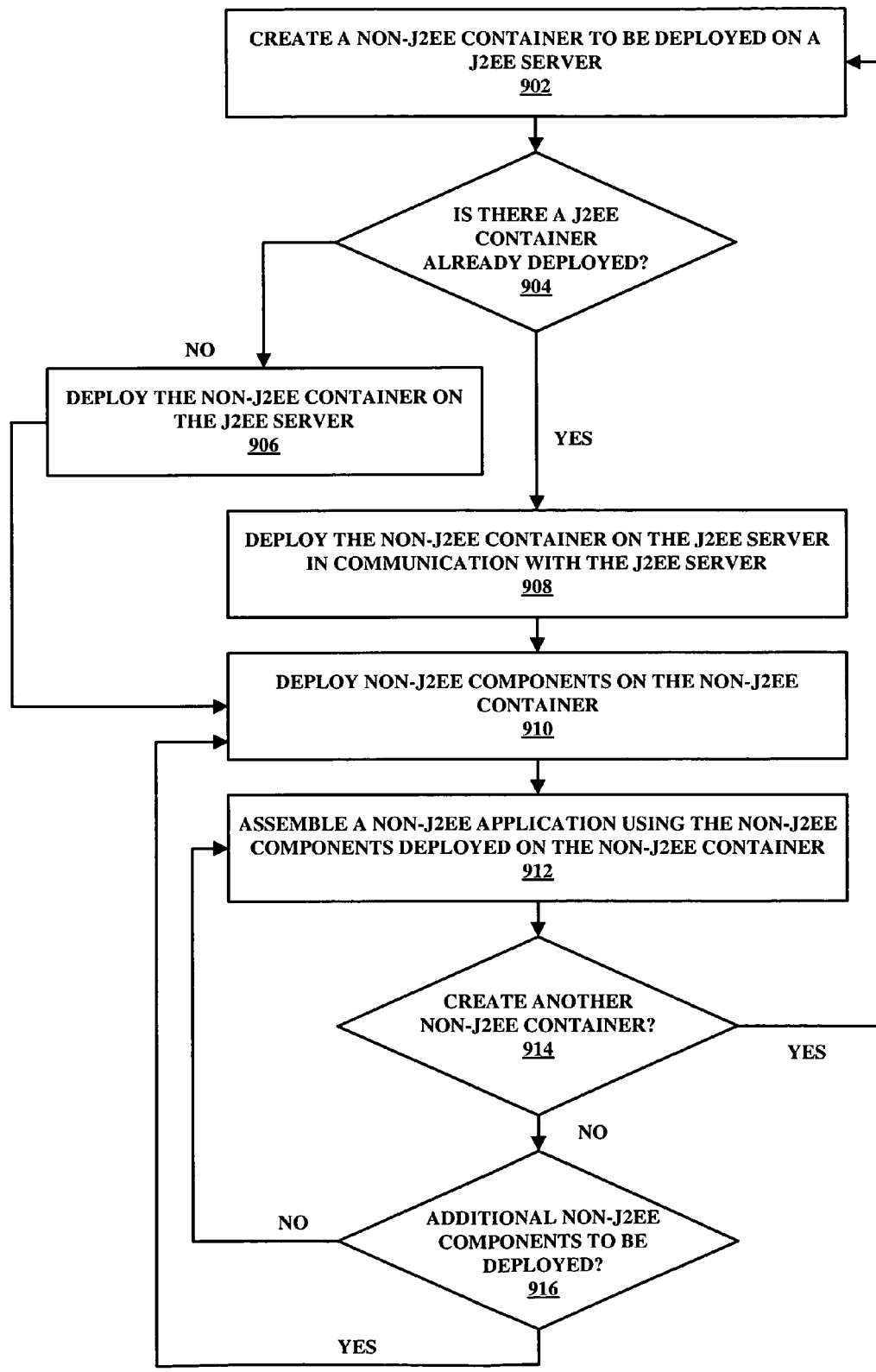
FIG. 9 is a flow diagram illustrating an embodiment of a process for implementing J2EE containers and non-J2EE containers in a J2EE architecture.

FIG. 9 is a flow diagram illustrating an embodiment of a process for implementing J2EE containers and non-J2EE containers on a J2EE server in a J2EE architecture. First, a non-J2EE container is created by a non-J2EE provider (e.g., SAP AG) to be integrated into a J2EE engine to facilitate the assembly of non-J2EE applications at processing block 902. At decision block 904, a determination is made as to whether there are any J2EE containers already deployed on the J2EE server. If there are no other J2EE containers, the non-J2EE container is deployed on the J2EE server using a deploy service via a set of interfaces, such as a deploy service API and a container API at processing block 906. In one embodiment, there may also be already deployed non-J2EE containers on the J2EE server. If there is an already deployed J2EE container, the non-J2EE container is deployed in communication with another already deployed J2EE container on the J2EE server at processing block 908. The newly deployed non-J2EE container may be deployed in communication with another already deployed J2EE container on the J2EE server.

At processing block 910, deploy non-J2EE components on the non-J2EE container using the deploy service. As with J2EE containers having J2EE components, non-J2EE containers include non-J2EE components that are used for the assembly of non-J2EE applications. The non-J2EE components and applications include SAP components and applications, respectively. Then, non-J2EE applications using the non-J2EE components on the non-J2EE container are assembled at processing block 912.

At decision block 914, a determination is made as to whether another non-J2EE container is needed. If yes, another non-J2EE container is created at processing block 902. If not, at decision block 916, a determination is made as to whether additional non-J2EE components are to be deployed. If yes, additional non-J2EE components are deployed at processing block 910. If not, the process continues with the assembling of additional non-J2EE applications at processing block 912.

Figure 10:
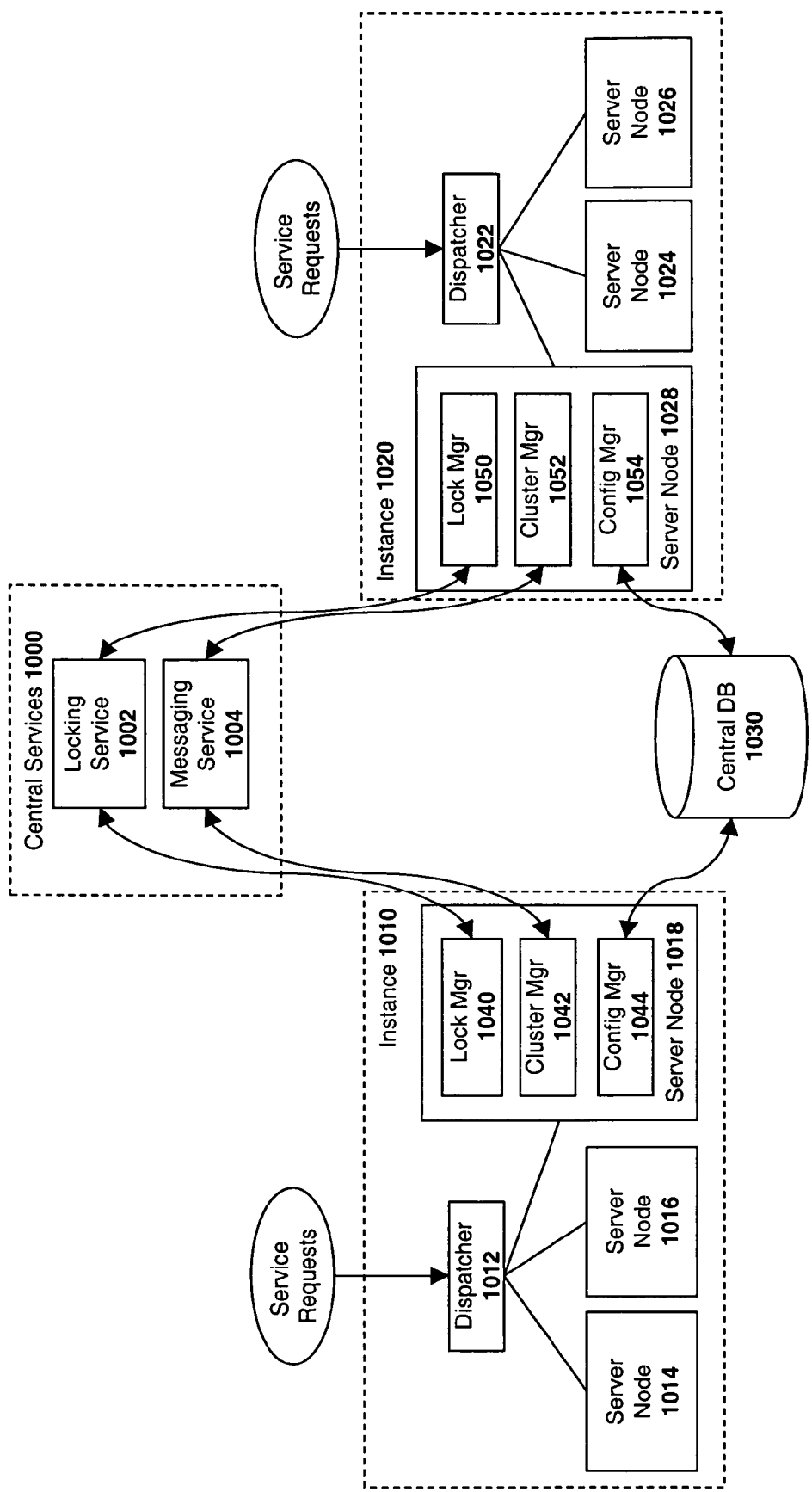
FIG. 10 is a block diagram illustrating an embodiment of a server node system architecture.

A system architecture according to one embodiment of the invention is illustrated in FIG. 10. The architecture includes a central services instance 1000 and a plurality of application server instances 1010, 1020. As used herein, the application server instances, 1010 and 1020, each include a group of server nodes 1014, 1016, 1018 and 1024, 1026, 1028, respectively, and a dispatcher, 1012, 1022, respectively. The central services instance 1000 includes a locking service 1002 and a messaging service 1004 (described below). The combination of all of the application server instances 1010, 1020 and the central services instance 1000 is referred to herein as a "cluster." Although the following description will focus solely on instance 1010 for the purpose of explanation, the same principles apply to other instances such as instance 1020.

The server nodes 1014, 1016, 1018 within instance 1010 provide the business and/or presentation logic for the network applications supported by the system. Each of the server nodes 1014, 1016, 1018 within a particular instance 1010 may be configured with a redundant set of application logic and associated data. In one embodiment, the dispatcher 1010 distributes service requests from clients to one or more of the server nodes 1014, 1016, 1018 based on the load on each of the servers. For example, in one embodiment, the dispatcher 1010 implements a round-robin policy of distributing service requests.

The server nodes 1014, 1016, 1018 may be J2EE server nodes which support EJB components and EJB containers (at the business layer) and Servlets and JSP (at the presentation layer). Of course, the embodiments of the invention described herein may be implemented in the context of various different software platforms including, by way of example, Microsoft .NET platforms and/or the ABAP platforms developed by SAP AG, the assignee of the present application.

In one embodiment, communication and synchronization between each of the instances 1010, 1020 is enabled via the central services instance 1000. As illustrated in FIG. 10, the central services instance 1000 includes a messaging service 1004 and a locking service 1002. The message service 1004 allows each of the servers within each of the instances to communicate with one another via a message passing protocol. For example, messages from one server may be broadcast to all other servers within the cluster via the messaging service 1004 (e.g., such as the cache configuration messages described below). Alternatively, messages may be addressed directly to specific servers within the cluster (i.e., rather than being broadcast to all servers).

In one embodiment, the locking service 1002 disables access to (i.e., locks) certain specified portions of configuration data and/or program code stored within a central database 1030 or resource shared in the cluster by different services. The locking manager locks data on behalf of various system components which need to synchronize access to specific types of data and program code (e.g., such as the configuration managers 1044, 1054). As described in detail below, the locking service enables a distributed caching architecture for caching copies of server/dispatcher configuration data.

In one embodiment, the messaging service 1004 and the locking service 1002 are each implemented on dedicated servers. However, the messaging service 1004 and the locking service 1002 may be implemented on a single server or across multiple servers while still complying with the underlying principles of the invention.

As illustrated in FIG. 10, each server node (e.g., 1018, 1028) includes a lock manager 1040, 1050 for communicating with the locking service 1002; a cluster manager 1042, 1052 for communicating with the messaging service 1004; and a configuration manager 1044, 1054 for communicating with a central database 1030 (e.g., to store/retrieve configuration data as described herein). Although the lock manager 1040, 1050, cluster manager 1042, 1052 and configuration manager 1044, 1054 are illustrated only with respect to server nodes 1018 and 1028 in FIG. 10, each of the server nodes 1014, 1016, 1024 and 1026 and/or on the dispatchers 1012, 1022 may be equipped with equivalent lock managers, cluster managers and configuration managers while still complying with the underlying principles of the invention.

Figure 11:
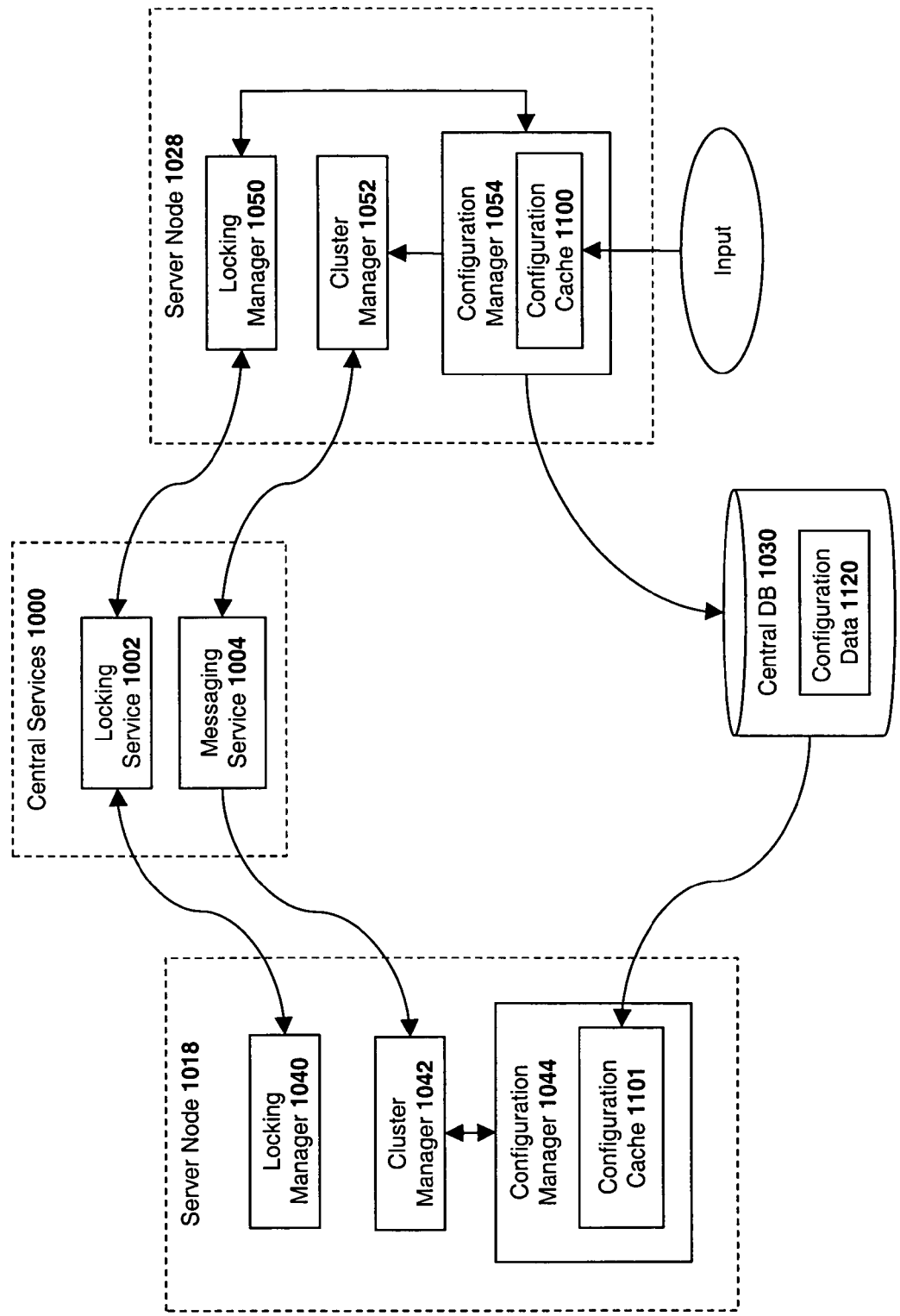
FIG. 11 is a block diagram illustrating an embodiment of a server node architecture which employs a configuration data caching.

Referring now to FIG. 11, in one embodiment, configuration data 1120 defining the configuration of the central services instance 1000 and/or the server nodes and dispatchers within instances 1010 and 1020, is stored within the central database 1030. By way of example, the configuration data may include an indication of the kernel, applications and libraries required by each dispatcher and server; network information related to each dispatcher and server (e.g., address/port number); an indication of the binaries required during the boot process for each dispatcher and server, parameters defining the software and/or hardware configuration of each dispatcher and server (e.g., defining cache size, memory allocation, . . . etc), and various other types of information related to the cluster. It should be noted, however, that the underlying principles of the invention are not limited to any particular set of configuration data.

In one embodiment of the invention, to improve the speed at which the various servers and dispatchers access the configuration data, the configuration managers 1044, 1054 cache configuration data locally within configuration caches 1100, 1101. As such, to ensure that the configuration data within the configuration caches 1100, 1101 remains up-to-date, the configuration managers 1044, 1054 implement cache synchronization policies, as described herein.

Figure 12:
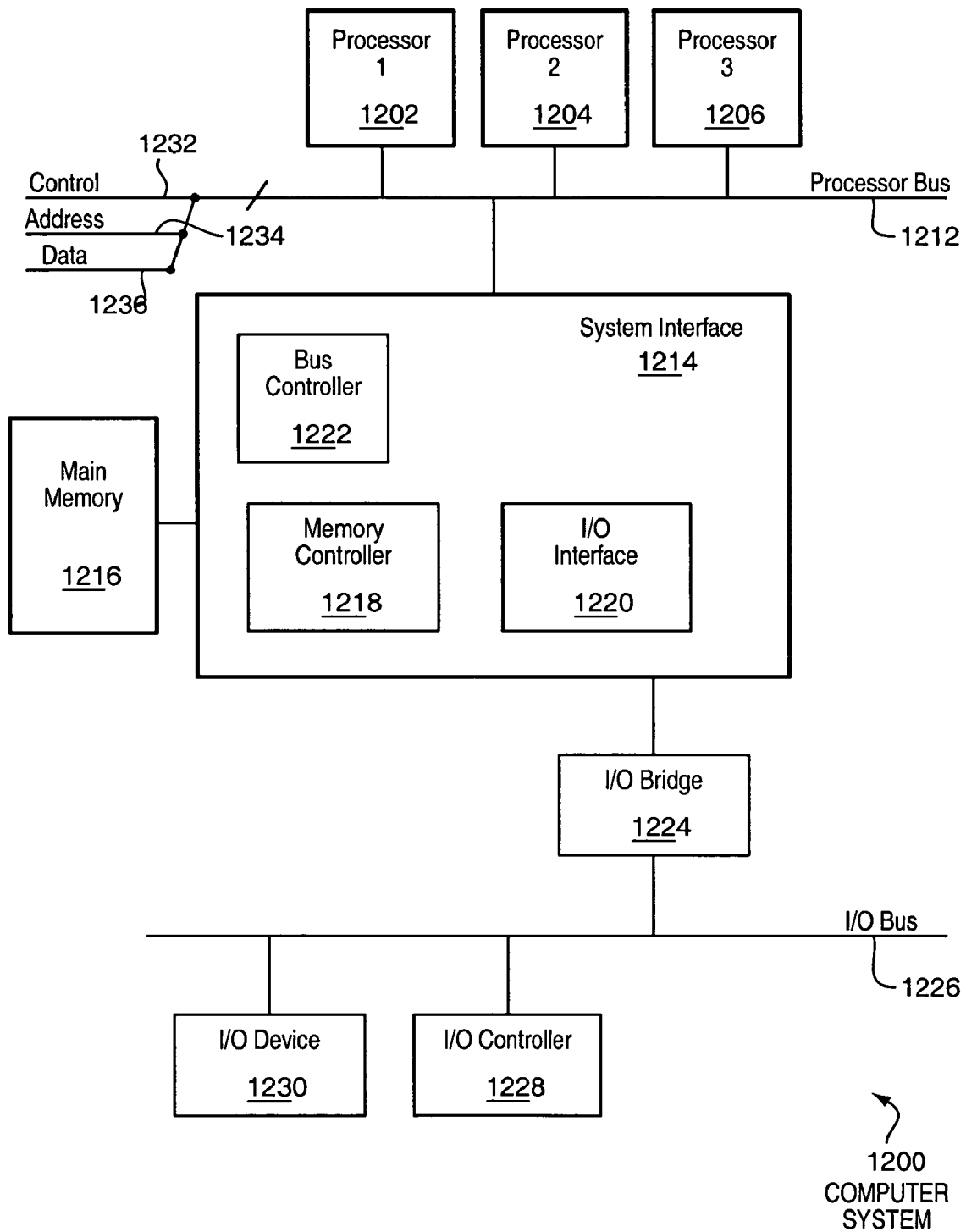
FIG. 12 is an exemplary computer system used for implementing an embodiment of the present invention.

FIG. 12 is an exemplary computer system 1200 used in implementing an embodiment of the present invention. The computer system (system) 1200 includes one or more processors 1202-1206. The processors 1202-1206 may include one or more single-threaded or multi-threaded processors. A typical multi-threaded processor may include multiple threads or logical processors, and may be capable of processing multiple instruction sequences concurrently using its multiple threads. Processors 1202-1206 may also include one or more internal levels of cache (not shown) and a bus controller or bus interface unit to direct interaction with the processor bus 1212.

Processor bus 1212, also known as the host bus or the front side bus, may be used to couple the processors 1202-1206 with the system interface 1214. Processor bus 1212 may include a control bus 1232, an address bus 1234, and a data bus 1236. The control bus 1232, the address bus 1234, and the data bus 1236 may be multidrop bi-directional buses, e.g., connected to three or more bus agents, as opposed to a point-to-point bus, which may be connected only between two bus agents.

System interface 1214 (or chipset) may be connected to the processor bus 1212 to interface other components of the system 1200 with the processor bus 1212. For example, system interface 1214 may include a memory controller 1218 for interfacing a main memory 1216 with the processor bus 1212. The main memory 1216 typically includes one or more memory cards and a control circuit (not shown). System interface 1214 may also include an input/output (I/O) interface 1220 to interface one or more I/O bridges or I/O devices with the processor bus 1212. For example, as illustrated, the I/O interface 1220 may interface an I/O bridge 1224 with the processor bus 1212. I/O bridge 1224 may operate as a bus bridge to interface between the system interface 1214 and an I/O bus 1226. One or more I/O controllers and/or I/O devices may be connected with the I/O bus 1226, such as I/O controller 1228 and I/O device 1230, as illustrated. I/O bus 1226 may include a peripheral component interconnect (PCI) bus or other type of I/O bus.

System 1200 may include a dynamic storage device, referred to as main memory 1216, a RAM, or other devices coupled to the processor bus 1212 for storing information and instructions to be executed by the processors 1202-1206. Main memory 1216 also may be used for storing temporary variables or other intermediate information during execution of instructions by the processors 1202-1206. System 1200 may include a ROM and/or other static storage device coupled to the I/O bus 1226 for storing static information and instructions for the processors 1202-1206.

Main memory 1216 or dynamic storage device may include a magnetic disk or an optical disc for storing information and instructions. I/O device 1230 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 1230 may also include an input device (not shown), such as an alphanumeric input device, including alphanumeric and other keys for communicating information and/or command selections to the processors 1202-1206. Another type of user input device includes cursor control, such as a mouse, a trackball, or cursor direction keys for communicating direction information and command selections to the processors 1202-1206 and for controlling cursor movement on the display device.

System 1200 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 1200 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 200 may vary from implementation to implementation depending upon numerous factors, such as price constraints, performance requirements, technological improvements, and/or other circumstances.

It should be noted that, while the embodiments described herein may be performed under the control of a programmed processor, such as processors 202-206, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 13:
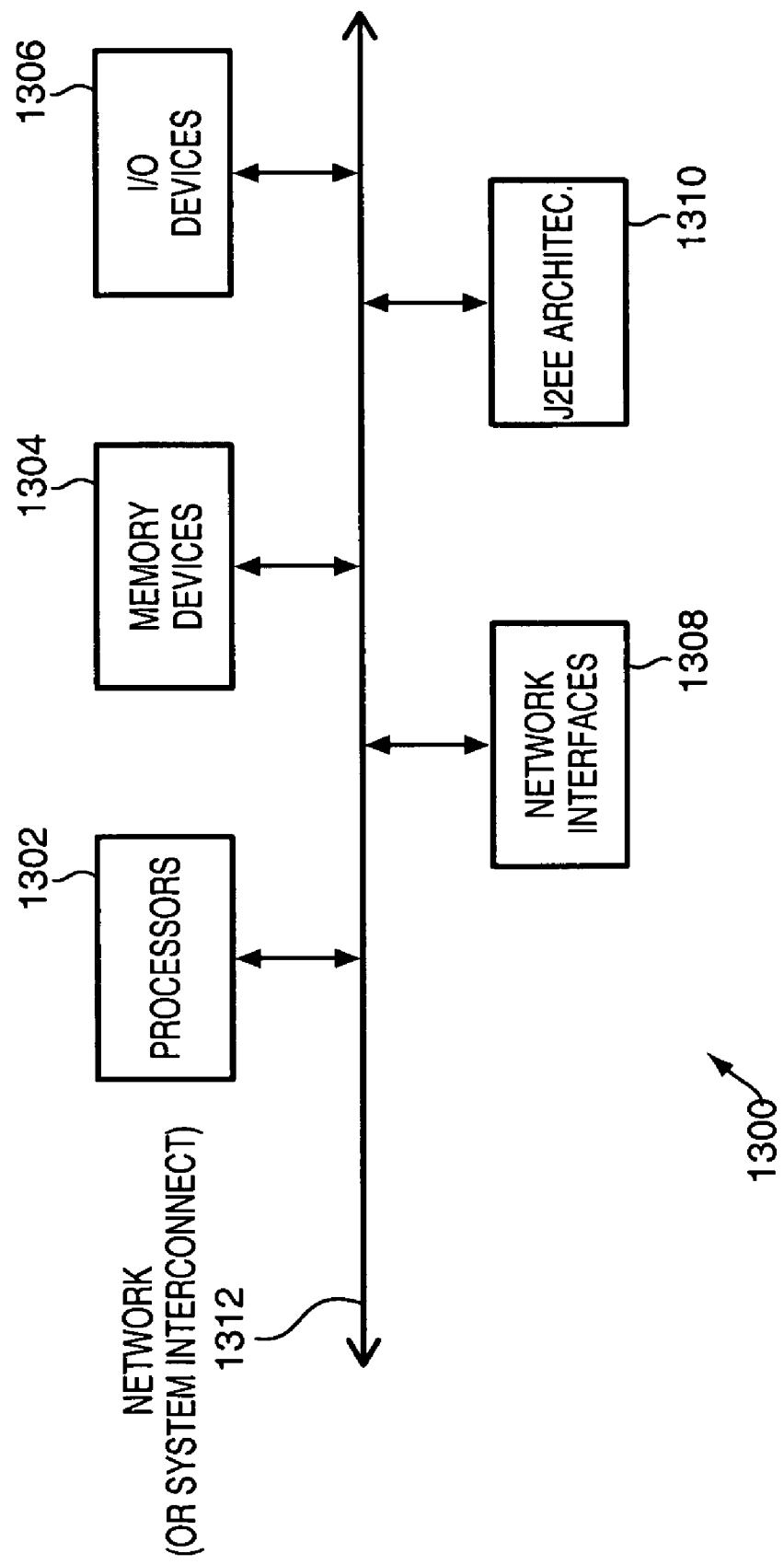
FIG. 13 is a block diagram illustrating an embodiment of a node implementation in a network.

FIG. 13 is a block diagram illustrating an embodiment of a node 1300 implementation in a network. According to one embodiment, the node 1300 may include one or more processors 1302 (e.g., processors 1202-1206 of FIG. 12), one or more memory devices 1304 (e.g., main memory 1216 of FIG. 12), one or more Input/Output (I/O) devices 1306 (e.g., I/O devices 1230 of FIG. 12), one or more network interfaces 1308, and J2EE architecture 1310, directly or indirectly, connected together and in communication with the network through a system or network interconnect 1312. The processors 1302 may include microprocessors, microcontrollers, FPGAs, ASICs, central processing units (CPUs), programmable logic devices (PLDs), and similar devices that access instructions from a system storage (e.g., memory 1304), decode them, and execute those instructions by performing arithmetic and logical operations.

The J2EE architecture 1310 may include J2EE and non-J2EE servers, containers, components, resources, services, and interfaces. The J2EE and non-J2EE components may include executable content, control logic (e.g., ASIC, PLD, FPGA, etc.), firmware, or some combination thereof, in one embodiment of the present invention. In embodiments of the invention in which the J2EE architecture 1310 may include executable content, it may be stored in the memory device 1304 and executed by the control processor 1302.

Memory devices 1304 may encompass a wide variety of memory devices including ROM, EPROM, EEPROM, RAM, non-volatile random access memory (NVRAM), cache memory, flash memory, and other memory devices. Memory devices 1304 may also include one or more hard disks, floppy disks, ZIP disks, CD-ROMs, digital versatile/video disks (DVD), magnetic random access memory (MRAM) devices, and other system-readable media that store instructions and/or data. Memory devices 1304 may store program modules, such as routines, programs, objects, images, data structures, program data, and other program modules that perform particular tasks or implement particular abstract data types that facilitate system use.

The I/O devices 1306 may include hard disk drive interfaces, magnetic disk drive interfaces, optical drive interfaces, parallel ports, serial controllers or super I/O controllers, serial ports, universal serial bus (USB) ports, display device interfaces (e.g., video adapters), network interface cards (NICs), sound cards, modems, and the like. System interconnect or network 1312 may permit communication between the various elements of node 1300. System interconnects 1312 may include a wide variety of signal lines including one or more of memory buses, peripheral buses, local buses, host buses, and bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
    establishing bi-directional communication between a first container and a second container included in an application server via a deploy communicator associated with a container interface, the application server executed via a computer processing device,
        the first container to implement and manage execution of application components not in accordance with a Java 2 Enterprise Edition (J2EE) standard,
        the second container to implement and manage execution of application components in accordance with the J2EE standard,
        the application server implemented in accordance with the J2EE standard,
        the deploy communicator and the container interface further associated with a deploy service for the application server, and
        the first container to communicate bi-directionally with the deploy service via the deploy communicator and the second container to communicate bi-directionally with the deploy service via the deploy communicator; and
    via the deploy service, deploying an application component not in accordance with the J2EE standard at the first container and an application component in accordance with the J2EE standard at the second container, wherein the first and second containers are in communication with other containers already deployed onto the application server,
    wherein the application server includes a Web container and an Enterprise JavaBeans (EJB) container, wherein the second container is either the Web container or the EJB container, and wherein the Web container and the EJB container are configured to specify a runtime environment for Web components and a runtime environment for enterprise beans, respectively, and are configured to perform at least one of security, concurrency, life-cycle management, or transaction deployment.

2. The method of claim 1, wherein the deploy service is further to deploy the first and second containers on the application server.

3. The method of claim 1, wherein the deploy service comprises a deploy module in communication with the application components of the first and second containers.

4. The method of claim 1, the application server coupled to a client including a deploy tool to deploy one or more entities on the server via the deploy service, the one or more entities associated with the first and second containers.

5. The method of claim 1, wherein the client comprises a viewer having one or more of a Graphical User Interface (GUI)-based viewer, and a Web-based browser.

6. A system comprising:
    a client to execute application components in accordance with a Java 2 Enterprise Edition (J2EE) standard and to execute application components not in accordance with the J2EE standard; and
    a server computer system coupled to the client, the server computer system having a processor and a storage system coupled with the processor, the computer system including an application server implemented in accordance with the J2EE standard having a deploy communicator associated with a container interface further associated with a deploy service to establish bi-directional communication between a first container and a second container, wherein
        the first container to implement and manage execution of application components not in accordance with the J2EE standard,
        the second container to implement and manage execution application component in accordance with the J2EE standard,
        the first container to further communicate bi-directionally with the deploy service via the deploy communicator and the second container to further communicate bi-directionally with the deploy service via the deploy communicator; and
        the deploy service to deploy an application component not in accordance with the J2EE standard at the first container, and an application component in accordance with the J2EE standard at the second container, the first and second application components in communication with other components already deployed on the application server;
    wherein the application server includes a Web container and an Enterprise JavaBeans (EJB) container, wherein the second container is either the Web container or the EJB container, and wherein the Web container and the EJB container are configured to specify a runtime environment for Web components and a runtime environment for enterprise beans, respectively, and are configured to perform at least one of security, concurrency, life-cycle management, or transaction deployment.

7. The system of claim 6, wherein the deploy service is further to deploy the first and second containers on the server.

8. The system of claim 7, wherein the deploy service comprises a deploy module in communication with the application components of the first and second containers.

9. The system of claim 7, the client including a deploy tool to deploy one or more entities on the server via the deploy service, the one or more entities associated with the first and second containers.

10. The system of claim 9, wherein the client comprises a viewer having one or more of a Graphical User Interface (GUI)-based viewer, and a Web-based browser.

11. A machine-readable storage medium comprising instructions which, when executed, cause a machine to perform:
   establishing bi-directional communication between a first container and a second container included in an application server via a deploy communicator associated with a container interface,
   the first container to implement and manage execution of application components not in accordance with a Java 2 Enterprise Edition (J2EE) standard,
   the second container to implement and manage execution of application components in accordance with the J2EE standard,
   the application server implemented in accordance with the J2EE standard,
   the deploy communicator and the container interface further associated with a deploy service for the application server, and
   the first container to communicate bi-directionally with the deploy service via the deploy communicator and the second container to communicate bi-directionally with the deploy service via the deploy communicator; and
   via the deploy service, deploying an application component not in accordance with the J2EE standard at the first container and an application component in accordance with the J2EE standard at the second container, wherein the first and second containers are in communication with other containers already deployed onto the application server;
   wherein the application server includes a Web container and an Enterprise JavaBeans (EJB) container, and wherein the second container is either the Web container or the EJB container, wherein the Web container and the EJB container are configured to specify a runtime environment for Web components and a runtime environment for enterprise beans, respectively, and are configured to perform at least one of security, concurrency, life-cycle management, or transaction deployment.

12. The machine-readable storage medium of claim 11, wherein the deploy service is further to deploy the first and second containers on the application server.

13. The machine-readable storage medium of claim 11, wherein the deploy service comprises a deploy module in communication with the application components of the first and second containers.

14. The machine-readable storage medium of claim 11, the application server coupled to a client including a deploy tool to deploy one or more entities on the server via the deploy service, the one or more entities associated with the first and second containers.

15. The machine-readable storage medium of claim 11, wherein the client comprises a viewer having one or more of a Graphical User Interface (GUI)-based viewer, and a Web-based browser.

* * * * *